United States Patent
Agarwal et al.

(10) Patent No.: US 8,041,575 B2
(45) Date of Patent: Oct. 18, 2011

(54) SYSTEM AND METHOD FOR ENABLING VOICE DRIVEN INTERACTIONS AMONG MULTIPLE IVR'S, CONSTITUTING A VOICE WORKFLOW

(75) Inventors: Sheetal K. Agarwal, Maharashtra (IN); Dipanjan Chakraborty, Kolkata (IN); Arun Kumar, New Delhi (IN); Amit A. Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 11/946,195

(22) Filed: Nov. 28, 2007

(65) Prior Publication Data
US 2009/0138269 A1    May 28, 2009

(51) Int. Cl.
*G10L 11/00* (2006.01)
(52) U.S. Cl. .................................. 704/270.1
(58) Field of Classification Search ............. 704/270.1
See application file for complete search history.

(56) References Cited

U.S. PATENT DOCUMENTS

| | | | |
|---|---|---|---|
| 6,202,054 B1 | 3/2001 | Lawlor et al. | |
| 6,731,625 B1 | 5/2004 | Eastep et al. | |
| 7,062,709 B2 * | 6/2006 | Cheung | 715/234 |
| 7,106,838 B2 | 9/2006 | Ryu et al. | |
| 7,180,985 B2 | 2/2007 | Colson et al. | |
| 7,201,313 B1 | 4/2007 | Ramachandran | |
| 7,840,466 B2 * | 11/2010 | Frazier et al. | 705/35 |
| 7,881,961 B2 * | 2/2011 | Ricketts | 370/230 |

* cited by examiner

*Primary Examiner* — Susan McFadden
(74) *Attorney, Agent, or Firm* — Derek S. Jennings; Gibb I.P. Law Firm, LLC

(57) ABSTRACT

A method for enabling voice driven interactions among multiple interactive voice response (IVR) systems begins by receiving a telephone call from a user of a first IVR system to begin a transaction; and, automatically contacting, by the first IVR system, at least one additional IVR system. Specifically, the contacting of the additional IVR system includes assigning tasks to the additional IVR system. The tasks require input from the user and the additional IVR system is secure and separate from the first IVR system. Moreover, the tasks can include a transfer of currency and a transfer of local information.

20 Claims, 8 Drawing Sheets

SYSTEM AND METHOD FOR ENABLING VOICE DRIVEN INTERACTIONS AMONG MULTIPLE IVR'S, CONSTITUTING A VOICE WORKFLOW

BACKGROUND

1. Field of the Invention

The embodiments of the invention provide a system and method for enabling voice driven interactions among multiple interactive voice response systems, and more particularly to a system and method that controls tasks between multiple voice systems.

2. Description of the Related Art

Interactive Voice Response systems (IVRs) are used by many organizations to interact with their customers and clients. IVR's are typically resident within the domain of a single enterprise, and are used to communicate with a user in order to accomplish a transaction (banking queries, airline reservation, flight schedule, etc.). Voice-driven interfaces have become very popular in acting as front-ends for several backend applications (airline reservation, flight schedule, etc.)

Workflows (human, machine or software) are commonly used to efficiently accomplish tasks. A lot of automation has been possible due to standardization, such as business process execution language (BPEL), web service definition language (WSDL), etc. For several workflow or processes, there are points where a unit of the workflow has to interact with humans. This interaction may occur using any interface, but is usually predetermined; the most common being text/data based.

An IVR application has two main components: the telephony channel that handles the call, and the backend application logic that drives the content of the call. For cross IVR applications apart from the call context transfer, application context transfer also needs to be performed. Examples of a call context include caller identification and the dialed number. Examples of an application context include the IVR menu option in the source IVR, user details, and target IVR menu option to switch to. Traditional telecom protocols (such as those in public switched telephone network (PSTN) network) restrict the application context that can be sent 'in-band', i.e., along with the call.

In addition, people in remote areas need information. Most of this information is local—restricted to within the geographical area (a few nearby villages/towns). The Internet does not help since most of the truly local information is not available on the Internet. Moreover, remote areas typically do not have reliable Internet connectivity and residents having little exposure to technology neither have a PC, nor the skills to operate it. However, the mobile penetration has increased tremendously in the last few years. Furthermore, current banking methods are not economically viable for delivering banking solutions at reasonable rates to the remote and sparsely populated areas with low transaction volume. The embodiments herein provide a pervasive, cost-effective, user-friendly medium for information capture and delivery to non-tech savvy users in remote areas.

SUMMARY

The embodiments of the invention enable Voice Workflows. A Voice Workflow is a workflow defined across multiple IVRs in which task control transfer is triggered and user input is gathered through a voice driven interface (for example, a phone call).

In addition, a system and method for information capture and delivery through phones (referred to herein as "VoiKiosk") is provided. The operational model for capture and delivery of dynamic, local information through mediation begins with a kiosk operator who captures information (through contacts, news sources) that can be locally relevant. The kiosk operator uploads the information to a portal (Voigen). Next, Voigen builds a voice interface for people to access the information through a phone. People access uploaded information either by calling or subscribing to alerts.

Furthermore, a system and method for enabling bank-on-a-phone (referred to herein as "VoiBank") enables traditional banking services to be made available through normal telephones. This goes beyond existing telebanking solutions where customers dial up their bank's IVR to perform limited transactions through their bank account. The advantages are that the system allows branchless banking that is economically viable for populations in remote areas that have low transaction volume. Enabling bank accounts, inter-account transfers and account to cash transfers through simple phone calls makes the present embodiments a viable solution for such customer base.

The embodiments of the invention provide a method for enabling voice driven interactions among multiple IVRs. The method begins by receiving a telephone call from a user to a first IVR to begin a transaction; and, automatically contacting, by the first IVR, at least one additional IVR. Specifically, the contacting of the additional IVR includes assigning tasks to the additional IVR. The tasks require input from the user, and the additional IVR is secure and separate from the first IVR. Moreover, the tasks can include a transfer of currency and a transfer of local information, wherein the local information comprises entertainment schedules, public transportation schedules, electrical blackout schedules, weather information, and/or a list of local visitors. The first IVR and the additional IVR can each have an automated voice system for receiving voice messages and/or touch tone messages from the user and for sending pre-recorded audio messages or dynamically generated audio messages to the user.

Additionally, the automated contacting of the additional IVR can include searching for context information in a store using a session identification number. If the context information is found, it is sent from the store to the additional IVR. If the context information is not found, a not-found code is sent to the first IVR.

Next, the telephone call is automatically transferred from the first IVR to the additional IVR. This can include, creating a session identification number for the telephone call, and transferring the session identification number and context information from the first IVR to the additional IVR. The context information can include user identification information, a user telephone number, menu options of the first IVR, and/or menu options of the additional IVR.

Following this, the input from the user is received by the additional IVR; and, the tasks are completed by the additional IVR (using the input from the user) to create task results. The additional IVR does not disclose the user input to the first IVR. The first IVR does not require the input from the user, and the input from the user can include personal and financial information of the user. Therefore the user information is kept confidential from the first IVR. Furthermore, the task results are automatically sent from the additional IVR to the first IVR. Subsequently, the telephone call is automatically transferred from the additional IVR back to the first IVR. The transaction is then completed between the user and the first IVR. These interactions between the first IVR and the additional IVR comprise a workflow.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
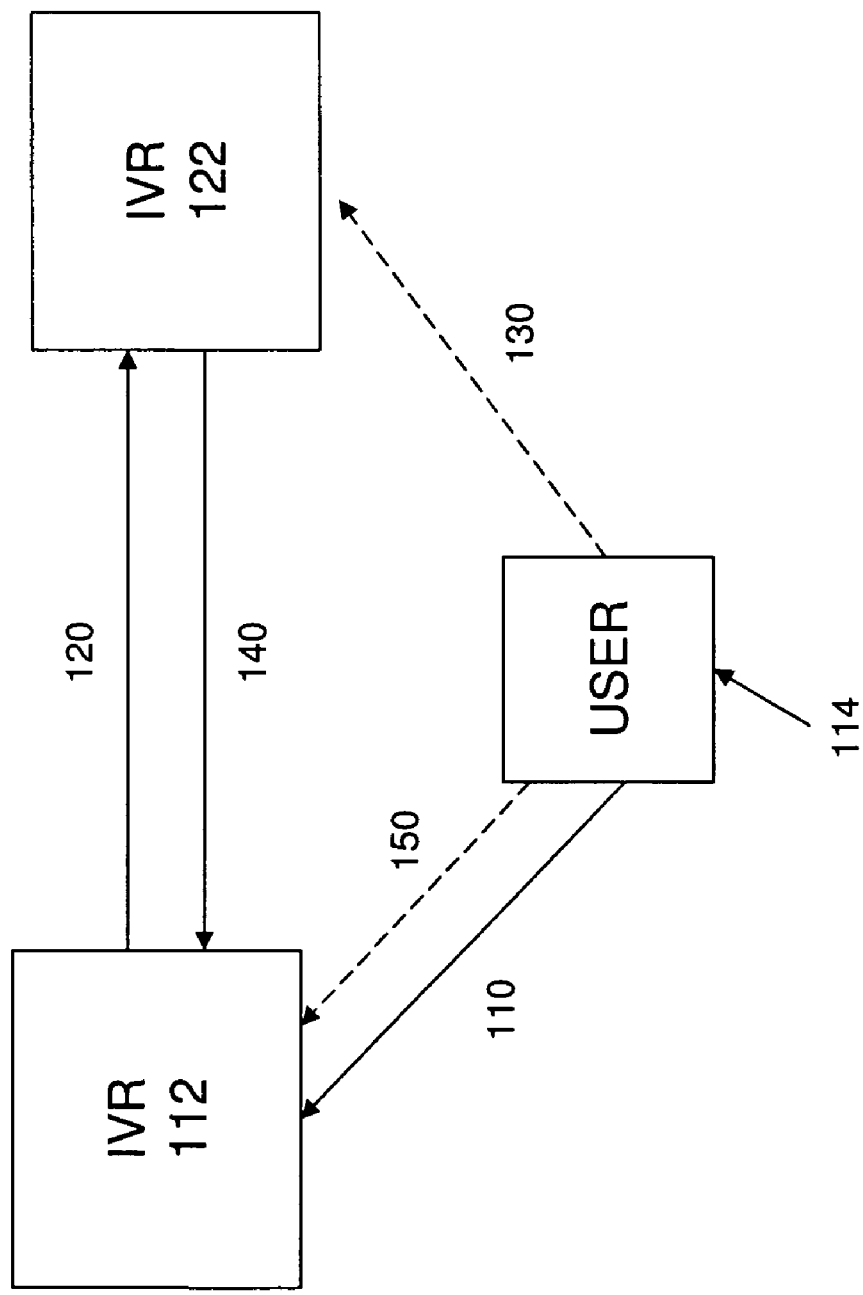
FIG. 1 illustrates a voice workflow defined across multiple IVRs.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

FIG. 1 illustrates a voice workflow 100. A workflow is a manual or automated business process that comprises of a series of tasks performed by a person, persons, or applications in order to achieve an overall goal. A voice workflow is a workflow defined across multiple IVRs in which task control transfer is triggered and user input is gathered through a voice driven interface (for example, a phone call).

The voice workflow 100 begins by a user 114 calling a first IVR 112 (item 110; e.g., call to make a railway reservation). Next, the first IVR 104 passes application context to a second IVR 122 (item 120; e.g., the application context for an online shopping application may include amount to be charged or account to be credited from). Following this, the call from the user 114 is transferred from the first IVR 112 to the second IVR 122 (item 130). At the second IVR, the user 114 can enter credit card information. Thus, the application hosted at the second IVR is the only IVR that maintains the user's credit card information and the user's credit card is not supplied to the first IVR. This prevents unnecessary sharing of sensitive information. Subsequently, the transaction results from the second IVR 122 are sent to the first IVR 112 (item 140); and, the call is transferred back to the first IVR 112 (item 150).

Thus, the voice workflow 100 enables business transactions that span across multiple, possibly cross-organizational IVRs. For example, transferring a call to a credit card payment gateway IVR from within a railway ticket reservation IVR and transferring the call back to continue with the transaction in the railway reservation IVR are actions provided by embodiments herein. Moreover, browsing of IVRs linked to each other is enabled, with operations for going forward or backward in the interaction chain, by embodiments herein.

Figure 2:
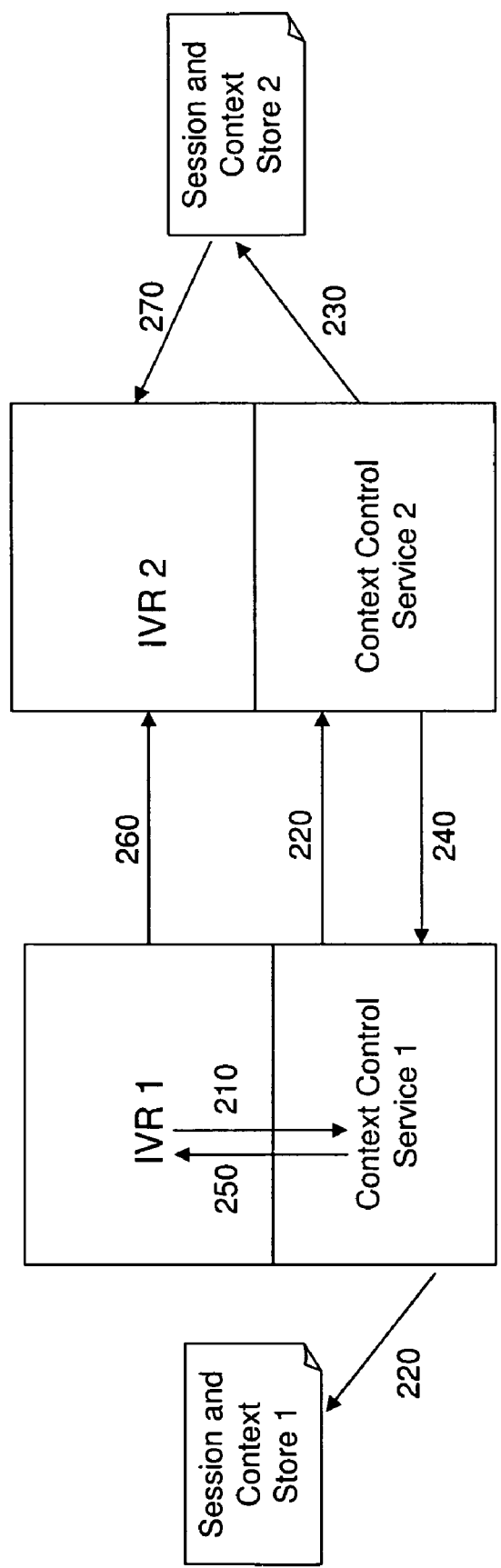
FIG. 2 illustrates detailed module level interaction within a workflow defined across multiple IVRs.

FIG. 2 illustrates a detailed functioning of a workflow defined across multiple IVRs. This exploits the IP infrastructure to enable Out-of-Band Context Information transfer (using Web Services, transmission control protocol/Internet protocol (TCP/IP), and other protocols) and synchronization between context transfer and call transfer. Thus, the SessionID and context information are transferred through Web Services. More specifically, an IVR 1 initiates a call transfer to the context control service 1 of the IVR 1 (item 210; e.g., Web Service). Next, the context control service 1 stores context information to a session and context store 1 and also transfers the context information to a context control service 2 (e.g., Web Service) of an IVR 2 (item 220). Following this, the context control service 2 creates a session on a session and context store 2 (item 230). An acknowledgement is then sent from the context control service 2 to the context control service 1 (item 240). Further, the context control service 1 sends an acknowledgment to the IVR 1 (item 250). Next, the IVR 1 transfers the call to the IVR 2 (item 260); and, the IVR 2 obtains the context information from the session and context store 2 (item 270).

The transfer of context information begins with a session setup. This includes creating a session id. Next, a context control service at the initiating site (IVR 1) transfers the context information along with the session id. Upon receiving the context information, a context control service at the target site (IVR 2) stores the context information in a session and context store. When the information is stored successfully, it returns an acknowledgment to the initiating site (IVR 1). Upon receiving the acknowledgement, the context control service at IVR 1 passes an acknowledgement to the IVR 1.

Session control includes calling the target site (IVR 2) from the initiating site (IVR 1) through a public switched telephone network (PSTN). The IVR 2 voice site, upon receiving the call, looks for any associated context information with this call. Caller ID can serve as the unique identifier to lookup associated sessions and context information. If context information is not available, it returns codes depending on the interpretation of the call (new call, incoming call with context, incoming call with context but context information deleted due to timeout, etc.) Otherwise, the IVR 2 accesses the context information from this page. The IVR 2 uses context information to determine the flow for the caller. It is recognized that the workflow can include browsing multiple, cross enterprise IVRs. This can involve a human controlled workflow, rather than a system driven workflow.

Figure 3:
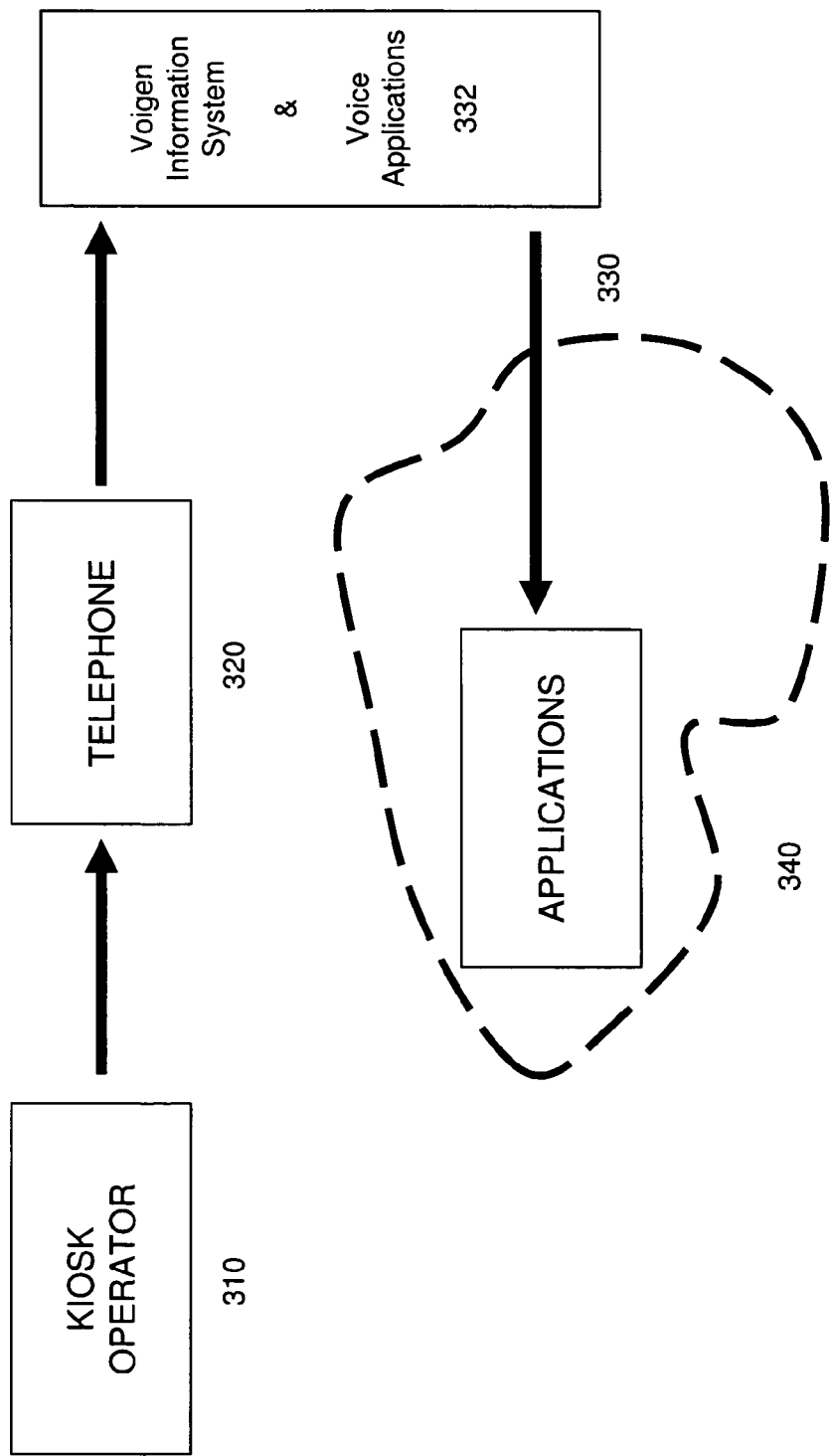
FIG. 3 illustrates a method for information capture and delivery through telephones.

FIG. 3 illustrates a method 300 for information capture and delivery through voice telephones. The method 300 begins by gathering local information from various sources by a kiosk operator (item 310). For example, the kiosk operator can make phone calls to get train schedules, movie lists for the day, blackout timings from the electricity office, weather information through the Internet, and/or a village visitor list (doctors, etc.). Next, the kiosk operator uploads the information through a telephone (item 320) by calling into the Voigen system. The uploaded information is received by the relevant Voice Application. This can be received by the Voigen information system and voice applications 332, which can manage the information and deliver the right information to the different applications 340 (item 330). Following this, villagers can call a VoiKiosk to get information on electricity-blackout timings, train schedules, weather predictions, movie listings, doctor-visits, etc.

Figure 4:
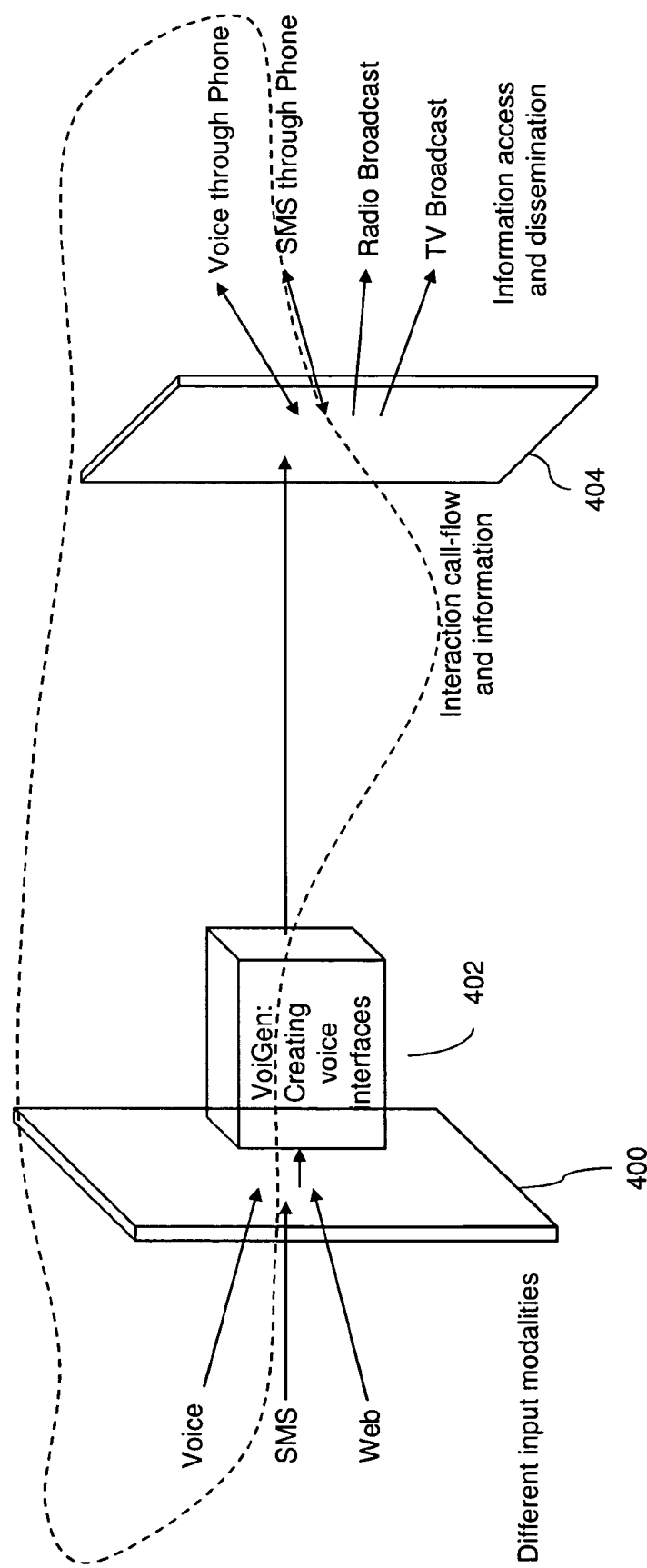
FIG. 4 illustrates technology used in a kiosk IVR.

FIG. 4 illustrates technology used in a kiosk IVR. More specifically, an application deployment and delivery infrastructure in the telecom network is provided. The infrastructure enables the capture of local information and the delivery of information by rendering through applications such as the Voigen 402 used to create voice interfaces. A voice-based user interface 400 is provided for populating the content with different input modalities. A voice-based interface 402 is also provided for information access and dissemination. In addition, other channels for dissemination of information 404 are also supported. These can include Short Message Services (SMS), a Web-based interface, and information broadcast within the local community through radio and/or television. Between the interfaces 400, 404 the embodiments herein provide interaction call flow and information.

The kiosk operator can get paid by the number of hits that are received at the VoiceSite that they have created. Thus, the kiosk operator has an incentive to identify and extract the information that is useful to its end customers. Customers pay premium charges while accessing the VoiceSite. This also generates revenue for the kiosk operator.

The embodiments of the invention provide a voice-based mechanism for information capture and delivery. Minimal IT requirements are given compared to traditional kiosks; only a phone is required as compared to a full blown kiosk. Moreover, there are low investment and maintenance cost since this can be hosted in the network. The embodiments herein provide greater reach than a stationary kiosk and are more user friendly, requiring a very small learning curve and a low cognitive load on the end-user.

Using this system does not require learning any new interaction modalities—just a voice conversation with the system is good enough. Semi-literate people interact with this system. At no extra cost (other than the cost of making a phone call) the community will be able to exchange the information. From the end-user's point-of-view, the embodiments herein require no extra device or hardware to capture and deliver information. When operating embodiments herein, users simply make calls through their (mobile) phones.

Many people face challenges to have access to standard banking channels and operations. These challenges include a low surplus income to open a bank account, invest or save. Moreover, for remote, sparsely populated areas, low value transactions are involved; although the collective volume may be high. Branches are costly to operate in such remote areas; automatic teller machines (ATM's) are not viable (cost/security/non-IT savvyness). To make such items viable, banks have to bring down the cost per transaction drastically. Furthermore, banks have complex risk models compared to local lenders. This leads to higher cost. Local lenders charge higher rates due to the absence of credit history. Both situations lead to higher interest rates for end-consumers. On the consumer end, issues include trusting the technology with their money. Accordingly, a low cost banking infrastructure is needed to support newly emerging products, such as micro-loans, micro-insurance, micro-mutual funds, micro investments, etc. The embodiments herein enable transaction oriented banking operations that are economically viable for high volume, low value transactions, with customers being illiterate or semi-literate and residing in remote, poorly connected areas.

More specifically, the embodiments of the invention provide self-service financial services through ordinary phones. A virtual phone number can be established that may map onto an actual phone number. This addresses situations where the actual phone number might change. The virtual phone number represents an authentic tele-online identity of the user that corresponds to a VoiceSite (in a similar manner to free Web-sites). The virtual phone number can be linked to a bank account, which is accessible through the VoiceSite.

Therefore, a tele-online bank account is enabled with embodiments herein. The creation of a virtual phone number and corresponding VoiceSite results into the creation of a bank account number. Alternatively, it could be a wallet instead of a bank account. Account-to-account payment involves paying from a phone number to another phone number. VoiceSite-linked-account management is a fixed option on each VoiceSite. The actual bank and the bank account number need not be exposed. If the target VoiceSite supports the bank interaction, the source VoiceSite's bank could get access to and interact with the target VoiceSite's bank. The tele-online bank account also eliminates paperwork, which can reduce costs.

Figure 5:
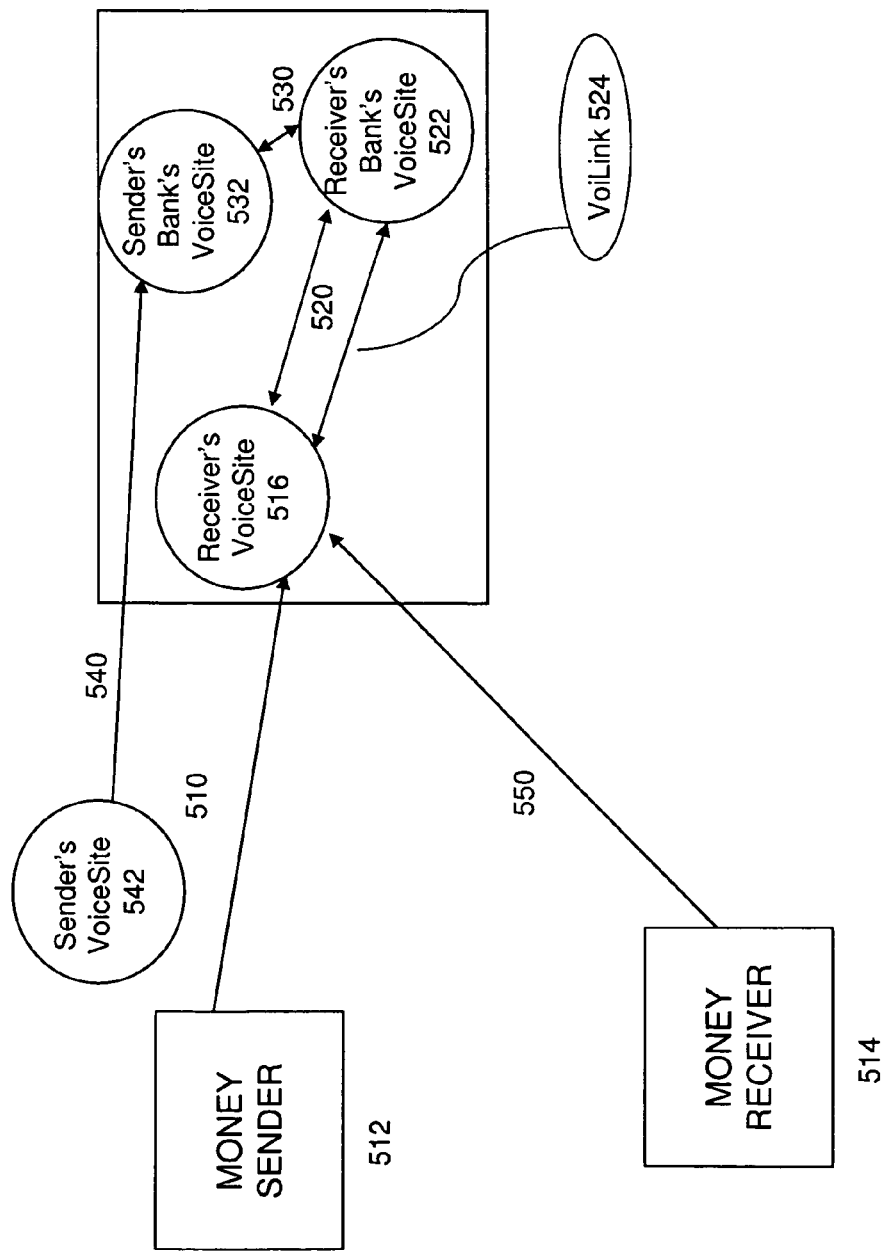
FIG. 5 illustrates a method for transferring money from sender's bank account to a receiver's bank account.

FIG. 5 illustrates a system and method for a banking IVR according to embodiments herein. First, a money-sender 512 wishing to send money to a money-receiver 514 calls a money-receiver's VoiceSite 516 (item 510). The call is then forwarded to the money-receiver's bank's VoiceSite 522 through VoiLink 524 (item 520). The money-receiver's bank's VoiceSite 522 then requests the money. Thus, the call is transferred to the money-sender's bank VoiceSite 532 for authentication purpose (item 530). Once the authentication is performed and amount withdrawn from the money-sender's bank VoiceSite 542, the amount is transferred to the money-receiver's bank (item 540). The money-receiver 514 makes a call to his VoiceSite 516 and gets the updated bank balance by making a phone call (item 550).

Thus, account to account transfer is possible by making just a phone call. The money-sender 512 and money-receiver 514 are also more satisfied since they talk to the other person's VoiceSite, which ensures that the amount being transferred is to the right person.

Figure 6:
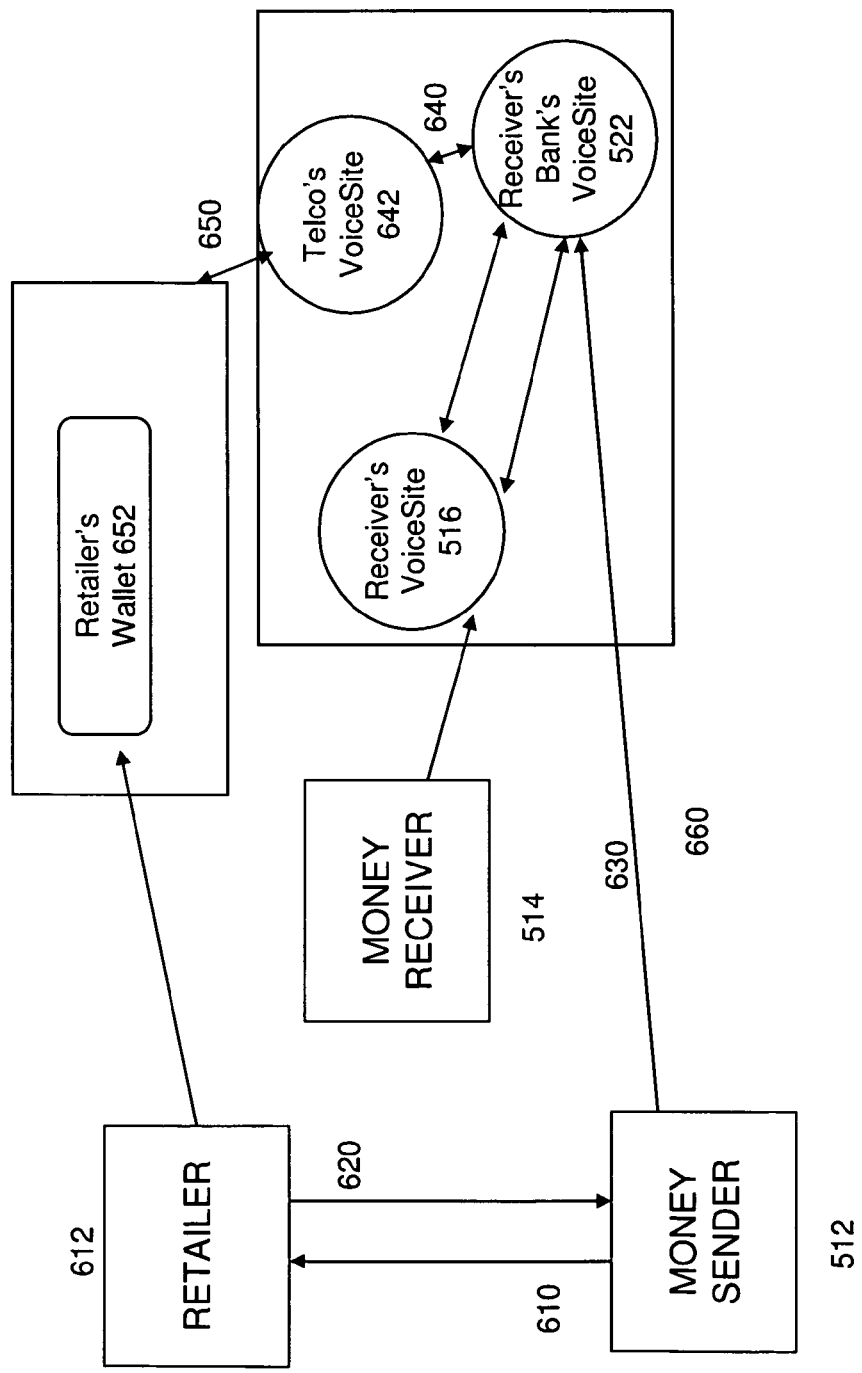
FIG. 6 illustrates a method for transferring money from a sender without a bank account to a receiver's bank account.

FIG. 6 illustrates a workflow where the money-sender 512 has cash and wants to transfer it to the money-receiver's 514 bank account. This is a cash-to-account transfer scenario. Here, a tie-up with a telecom-retail-store 612 is assumed. The money-sender 512 first deposits cash at the telco-retail-store (item 610). In return, the money-sender 512 gets a transaction ID (TransID) in item 620. A request goes to the receiver's bank VoiceSite 522, wherein the money-sender 512 makes a request for a cash money transfer and specifies the amount (item 630). The bank VoiceSite 522 then transfers the call to the telco VoiceSite 642 and the money-sender 512 specifies the TransID and the amount to the telco VoiceSite 642 (item 640). The amount is then withdrawn from the telco's wallet 652 and deposited to the receiver's bank account 522 (item 650). The money-receiver 514 can again make a call to get the updated balance from the bank or from his VoiceSite 516 (item 660).

Existing banking efforts fail to provide a viable last mile solution that can provide access to people in remote areas.

The banking IVR embodiments herein solve this problem by utilizing the already established telecom infrastructure and voice-based access over the telephone as the interface. This does away with the need to have mobile or fixed bank branches. Current methods are semi-automated and require the knowledge of source and target banks and account numbers. The banking IVR increases automation by requiring only the phone number to be known. This keeps the cognitive load to a minimum for the user segment. Telecom providers already give out post-paid connections through their retailers by simply collecting basic data about the subscriber. The same model can be followed for creation of the banking IVR accounts. For cash transfers, the sender need not have an account. The banking IVR can be used to offer several banking operations (e.g., account creation, loans, etc.)

The last mile infrastructure to be used by embodiments herein is already deployed in terms of landline phones and mobile phone connectivity with penetration being advanced further. The backend infrastructure also already exists. The embodiments herein replace currently existing account transfer models of "find the bank first, then the account" to "call up, get linked to the corresponding bank and the account". Moreover, the user interface is simple and usable by the illiterate/semi-literate population. Easy access is enabled with the ability to pay others without having to deal with cash. In regards to safety and security, money is kept in an electronic wallet or bank account which is as safe as today's banking systems. Thus, the loss of a mobile telephone does not compromise security. Authentication could be phone-based, speaker recognition-based, PIN based, etc. Having a phone number as a bank account is similar in safety to credit/debit cards.

Figure 7:
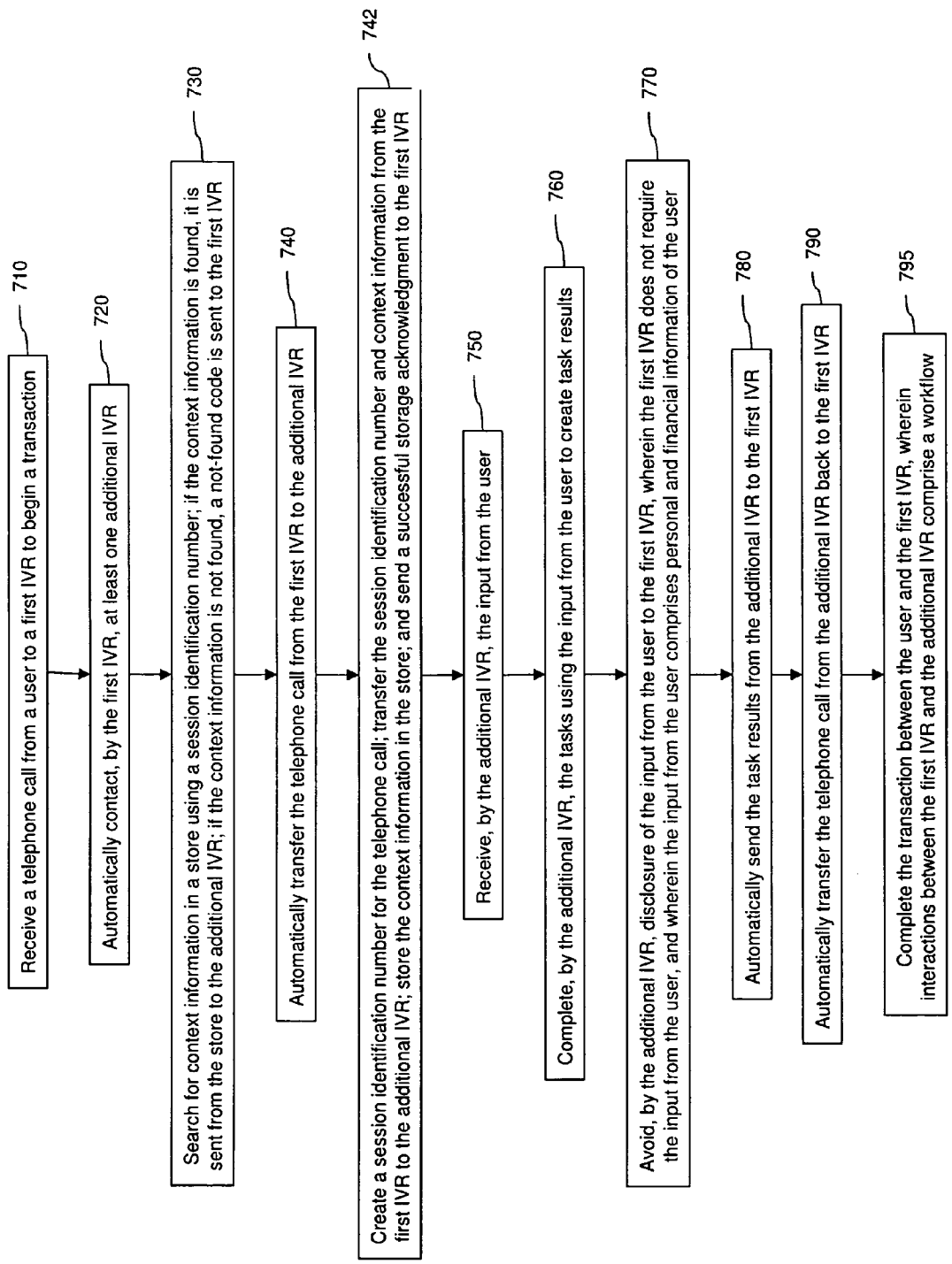
FIG. 7 illustrates a flow diagram of a method for enabling voice driven interactions among multiple IVRs.

FIG. 7 illustrates a flow diagram of a method for enabling voice driven interactions among multiple IVRs. The method begins by receiving a telephone call from a user to a first IVR to begin a transaction (item 710); and, programmatically (automatically) contacting, by the first IVR, at least one additional IVR (item 720). Specifically, the contacting of the additional IVR includes assigning tasks to the additional IVR, wherein the tasks require input from the user, and wherein the additional IVR is secure and separate from the first IVR. Moreover, the tasks can include a transfer of currency and a transfer of local information, wherein the local information comprises at least one of entertainment schedules, public transportation schedules, electrical blackout schedules, weather information, and/or a list of local visitors. The first IVR and the additional IVR can each have an automated voice system for receiving voice messages and/or touch tone messages from the user and for sending pre-recorded audio messages or dynamically generated audio messages to the user.

In item 730, the automated contacting of the additional IVR can include searching for context information in a store using a session identification number. If the context information is found, it is sent from the store to the additional IVR. If the context information is not found, a not-found code is sent to the first IVR.

Next, in item 740, the telephone call is automatically transferred from the first IVR to the additional IVR. This can include, in item 742, creating a session identification number for the telephone call, and transferring the session identification number and context information from the first IVR to the additional IVR. The context information can include user identification information, a user telephone number, menu options of the first IVR, and/or menu options of the additional IVR.

Following this, the input from the user is received by the additional IVR (item 750); and, the tasks are completed by the additional IVR (using the input from the user) to create task results (item 760). The second IVR does not disclose the input from the user to the first IVR because the first IVR does not require the input from the user, and the input from the user can include personal and financial information of the user (item 770). Furthermore, the task results are automatically sent from the additional IVR to the first IVR (item 780). Subsequently, the telephone call is automatically transferred from the additional IVR back to the first IVR (item 790). The transaction is then completed between the user and the first IVR, wherein interactions between the first IVR and the additional IVR comprise a workflow (item 795).

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
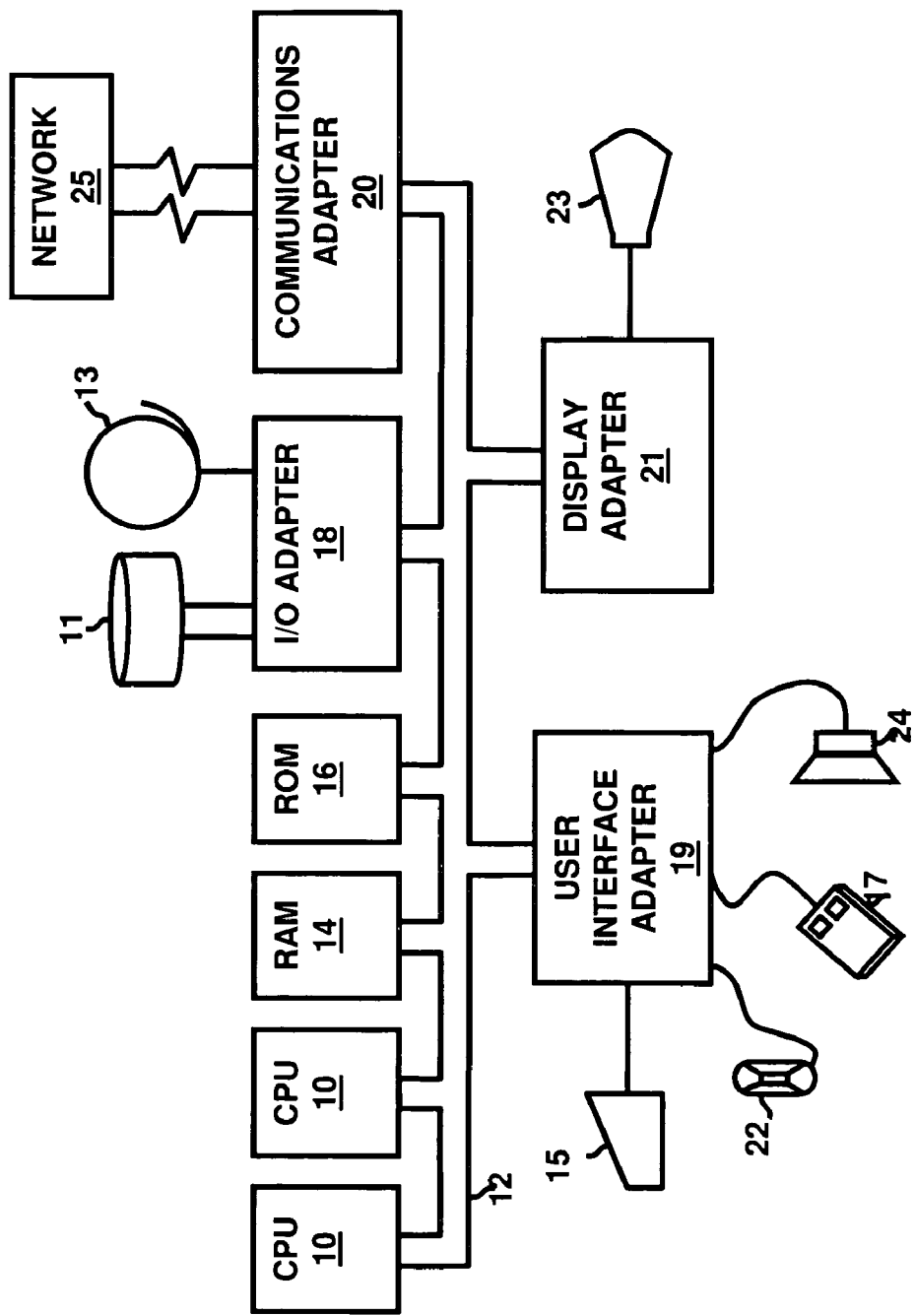
FIG. 8 illustrates a hardware configuration of an information handling/computer system.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method for enabling voice driven interactions among multiple interactive voice response (IVR) systems, said method comprising:

receiving a telephone call from a user to a first IVR system to begin a transaction;

programmatically contacting, by said first IVR system, at least one additional IVR system, wherein said contacting comprises invoking tasks on said additional IVR system, and wherein said tasks require input from said user;

automatically transferring said telephone call from said first IVR system to said additional IVR system to allow exclusive communication only between said additional IVR system and said user;

receiving, by said additional IVR system, said input from said user so that said input is not supplied to said first IVR system;

completing, by said additional IVR system, said tasks using said input from said user to create task results;

automatically sending said task results from said additional IVR system to said first IVR system;

automatically transferring said telephone call from said additional IVR system back to said first IVR system; and completing said transaction between said user and said first IVR system.

2. The method according to claim 1, wherein said automatically transferring of said telephone call from said first IVR to said additional IVR system comprises automatically transferring an application context from said first IVR system to said additional IVR system through a network.

3. The method according to claim 2, wherein said automatically transferring of said application context from said first IVR system to said additional IVR system comprises:

creating a session identification number for said telephone call;

transferring said session identification number and context information from said first IVR system to said additional IVR system;

storing said context information in a store; and sending a successful storage acknowledgment to said first IVR system.

4. The method according to claim 3, wherein said context information comprises at least one of user identification information, a user telephone number, menu options of said first IVR system, and menu options of said additional IVR system.

5. The method according to claim 3, wherein said programmatically contacting of said additional IVR system further comprises:

searching for said context information in said store using said session identification number;

if said context information is found, sending said context information from said store to said additional IVR system; and if said context information is not found, sending a not-found code to said first IVR system.

6. The method according to claim 1, wherein said first IVR system does not require said input from said user, and wherein said input from said user comprises personal and financial information of said user.

7. The method according to claim 1, wherein said first IVR system and said additional IVR system each comprise an automated voice system for receiving at least one of voice input and touch tone input from said user and for playing one of pre-recorded audio messages and dynamically generated audio messages to said user.

8. A method for enabling voice driven interactions among multiple interactive voice response (IVR) systems, said method comprising:

receiving a telephone call from a user to a first IVR system to begin a transaction;

programmatically contacting, by said first IVR system, at least one additional IVR system, wherein said contacting comprises assigning tasks to said additional IVR system, wherein said tasks require input from said user, and wherein said additional IVR system is secure and separate from said first IVR system;

automatically transferring said telephone call from said first IVR system to said additional IVR system to allow exclusive communication only between said additional IVR system and said user;

receiving, by said additional IVR system, said input from said user so that said input is not supplied to said first IVR system;

completing, by said additional IVR system, said tasks using said input from said user to create task results;

avoiding, by said additional IVR system, disclosure of said input from said user to said first IVR system;

automatically sending said task results from said additional IVR system to said first IVR system;

automatically transferring said telephone call from said additional IVR system back to said first IVR system; and completing said transaction between said user and said first IVR system.

9. The method according to claim 8, wherein said automatically transferring of said telephone call from said first IVR system to said additional IVR system comprises:

creating a session identification number for said telephone call;

transferring said session identification number and context information from said first IVR system to said additional IVR system;

storing said context information in a store; and sending a successful storage acknowledgment to said first IVR system.

10. The method according to claim 9, wherein said context information comprises at least one of user identification information, a user telephone number, menu options of said first IVR system, and menu options of said additional IVR system.

11. The method according to claim 9, wherein said programmatically contacting of said additional IVR system further comprises:
    searching for said context information in said store using said session identification number;
    if said context information is found, sending said context information from said store to said additional IVR system; and
    if said context information is not found, sending a not-found code to said first IVR system.

12. The method according to claim 8, wherein said first IVR system does not require said input from said user, and wherein said input from said user comprises personal and financial information of said user.

13. The method according to claim 8, wherein said first IVR system and said additional IVR system each comprise an automated voice system for receiving at least one of voice messages and touch tone messages from said user and for sending one of pre-recorded audio messages and dynamically generated audio messages to said user.

14. The method according to claim 8, wherein said tasks comprise at least one of a transfer of currency and a transfer of local information, wherein said local information comprises at least one of entertainment schedules, public transportation schedules, electrical blackout schedules, weather information, and a list of local visitors.

15. A method for enabling voice driven interactions among multiple interactive voice response (IVR) systems, said method comprising:
    receiving a telephone call from a user to a first IVR system to begin a transaction;
    programmatically contacting, by said first IVR system, at least one additional IVR system, wherein said contacting comprises assigning tasks to said additional IVR system, wherein said tasks require input from said user, and wherein said additional IVR system is secure and separate from said first IVR system;
    automatically transferring said telephone call from said first IVR system to said additional IVR system to allow exclusive communication only between said additional IVR system and said user, wherein said transferring comprises:
        creating a session identification number for said telephone call;
        transferring said session identification number and context information from said first IVR system to said additional IVR system;
        storing said context information in a store; and
        sending a successful storage acknowledgment to said first IVR system;
    receiving, by said additional IVR system, said input from said user so that said input is not supplied to said first IVR system;
    completing, by said additional IVR system, said tasks using said input from said user to create task results;
    avoiding, by said additional IVR system, disclosure of said input from said user to said first IVR system, wherein said first IVR system does not require said input from said user, and wherein said input from said user comprises personal and financial information of said user;
    automatically sending said task results from said additional IVR system to said first IVR system;
    automatically transferring said telephone call from said additional IVR system back to said first IVR system; and
    completing said transaction between said user and said first IVR system, wherein interactions between said first IVR system and said additional IVR system comprise a workflow.

16. The method according to claim 15, wherein said context information comprises at least one of user identification information, a user telephone number, menu options of said first IVR system, and menu options of said additional IVR system.

17. The method according to claim 15, wherein said programmatically contacting of said additional IVR system further comprises:
    searching for said context information in said store using said session identification number;
    if said context information is found, sending said context information from said store to said additional IVR system; and
    if said context information is not found, sending a not-found code to said first IVR system.

18. The method according to claim 15, wherein said first IVR system and said additional IVR system each comprise an automated voice system for receiving at least one of voice messages and touch tone messages from said user and for sending one of pre-recorded audio messages and dynamically generated audio messages to said user.

19. The method according to claim 15, wherein said tasks comprise at least one of a transfer of currency and a transfer of local information, wherein said local information comprises at least one of entertainment schedules, public transportation schedules, electrical blackout schedules, weather information, and a list of local visitors.

20. A non-transitory program storage device readable by machine, tangibly embodying a program of instructions executable by the machine to perform a method for enabling voice driven interactions among multiple interactive voice response (IVR) systems, said method comprising:
    receiving a telephone call from a user to a first IVR system to begin a transaction;
    programmatically contacting, by said first IVR system, at least one additional IVR system, wherein said contacting comprises assigning tasks to said additional IVR system, and wherein said tasks require input from said user;
    automatically transferring said telephone call from said first IVR system to said additional IVR system to allow exclusive communication only between said additional IVR system and said user;
    receiving, by said additional IVR system, said input from said user so that said input is not supplied to said first IVR system;
    completing, by said additional IVR system, said tasks using said input from said user to create task results;
    automatically sending said task results from said additional IVR system to said first IVR system;
    automatically transferring said telephone call from said additional IVR system back to said first IVR system; and
    completing said transaction between said user and said first IVR system.

* * * * *